United States Patent [19]

Fukushima et al.

[11] Patent Number: 5,113,470

[45] Date of Patent: May 12, 1992

[54] OPTICAL WAVE GUIDE SHEET COMPRISING PLURALITY OF DOUBLY-CLAD CORE MEMBERS WITH LIGHT SCATTERERS IN OUTER CLADDING

[75] Inventors: Tetsuo Fukushima, Hirakata; Kenichiro Suetsugu, Amagasaki; Munekazu Nishihara, Neyagawa; Junji Ikeda, Ikoma, all of Japan

[73] Assignee: Matsushita Electric Industrial Co., Ltd., Osaka, Japan

[21] Appl. No.: 433,209

[22] Filed: Nov. 8, 1989

[51] Int. Cl.⁵ .................................................. G02B 6/22
[52] U.S. Cl. .................................... 385/126; 385/115; 385/127
[58] Field of Search ............... 350/96.10, 96.29, 96.30, 350/96.31, 96.32, 96.33, 96.34, 96.24; 385/115, 116, 123, 125, 126, 127, 128, 147

[56] References Cited

U.S. PATENT DOCUMENTS

| | | | |
|---|---|---|---|
| 3,414,837 | 12/1968 | Snitzer | 350/96.24 X |
| 3,544,192 | 12/1970 | Goldstein | 350/96.24 |
| 3,556,635 | 1/1971 | Schrenk et al. | 350/96.24 |
| 4,070,091 | 1/1978 | Taylor et al. | 350/96.31 |
| 4,167,305 | 9/1979 | Ichiba et al. | 350/96.34 |
| 4,575,181 | 3/1986 | Ishikawa | 350/96.33 X |
| 4,678,273 | 7/1987 | Vilhelmsson | 350/96.30 |
| 4,693,556 | 9/1987 | McCaughan, Jr. | 350/96.10 X |

Primary Examiner—John D. Lee
Attorney, Agent, or Firm—Wenderoth, Lind & Ponack

[57] ABSTRACT

An optical waveguide device includes a plurality of optical waveguides extending adjacent each other in a sheet-like form. Each of the waveguides includes core portion, an inner cladding layer formed on a periphery of the core portion, and an outer cladding layer formed on a periphery of the inner cladding layer. The inner cladding layer is devoid of light scatterers, whereas the outer cladding layer has light scatterers disposed therein. As light travels within the core portion, such light is efficiently reflected at the surface of the inner cladding layer. The outer cladding layer having the light scatterers disposed therein functions to inhibit crosstalk between adjacent waveguides.

2 Claims, 6 Drawing Sheets

OPTICAL WAVE GUIDE SHEET COMPRISING PLURALITY OF DOUBLY-CLAD CORE MEMBERS WITH LIGHT SCATTERERS IN OUTER CLADDING

BACKGROUND OF THE INVENTION

The present invention relates to an optical waveguide sheet which is utilized for reading facsimile image information.

Conventionally, reading of facsimile image information is carried out using an optical sheet in which a plurality of optical fibers having a photo-absorption layer are arranged in a flat plate-like form, or using an optical waveguide sheet in which a scatterer portion having a low reflection factor is formed. The latter is made of a transparent plastic sheet impregnated with a polymeric monomer, on which light or an electron beam is irradiated while polymeric conditions are controlled and proper heat-treatment is carried out.

FIGS. 14-16 show conventional examples of optical waveguide sheets used for reading of image information.

FIG. 14 depicts a first example of an optical sheet 41 in which optical fibers 44 composed of a core portion 42 and a cladding portion 43 are arranged in parallel and a plurality of photo-absorption layers 45 are formed in the voids at the outer circumference of the fibers 44. FIG. 15 depicts a second conventional example of an optical waveguide sheet, in which a polymeric monomer is reacted and polymerized with transparent plastic. This portion 47 has a low reflection factor, and functions as a cladding layer since light scatterers are formed inside the portion by the controlled polymeric conditions and heat-treatment. Reference numeral 48 denotes a core portion in which a reflection factor of the transparent plastic composing a base does not change even from the application with the above treatment. FIG. 16 is a section view along a direction A shown in FIG. 15 in which reference numeral 49 denotes scatterers, reference numeral 50 denotes incident light entering at an angle which is greater than a critical angle determined by the respective reflection factors of a core portion 51 and a cladding layer 52, reference numeral 50a denotes a path of incident light in the case of an absence of scatterers 49, reference numeral 53 denotes incident light entering at an angle which is smaller than the critical angle, reference numeral 54 denotes a copy surface, reference numeral 55 denotes a photo-sensor surface, and reference numeral 56 denotes scattered light. From among the light reflected from the illuminated copy surface, the incident light entering at an angle which is smaller than the critical angle is repeatedly totally-reflected at the boundary of the cladding layer 52 to reach the photo-sensor surface 55. However, if a scatterer exists on the boundary portion upon such reflection, the reflection efficiency is reduced due to light scattering. Additionally, the incident light entering at an angle which is greater than the critical angle is scattered due to the presence of the scatterers 49 in the cladding layer 52, and only a small amount of light enters the adjacent core portion 51a.

In the first conventional example, proper arrangement of the optical fibers is extremely difficult, and hence it is too costly to achieve. In the second conventional example, the manufacturing cost is relatively low, but since the incident light is reflected by the scatterers, light denoting read image information on the copy surface is not totally reflected, thus reducing the transmission efficiency of light arriving at the photo-sensor surface 55.

SUMMARY OF THE INVENTION

The object of the present invention is to eliminate the above disadvantages of the prior art and to provide an optical waveguide sheet having a high image resolution, high transmission efficiency, and low manufacturing cost.

The present invention achieves this object by providing an optical waveguide sheet having first and second cladding layers and a plurality of optical waveguide paths arranged in flat plate-like form and optical scatterers disposed in one of the cladding layers. More particularly, first cladding layers which are devoid of scatterers are disposed between core portions and the second cladding portions having scatterers, whereby reflected light advances in a totally reflected manner at the boundaries between first cladding layers and core portions and attenuation of the light due to the presence of scatterers is almost nil. Additionally, since the scatterers are disposed in the second cladding portions, crosstalk is minimized between adjacent core portions.

DETAILED DESCRIPTION OF THE INVENTION

In the following, an embodiment of the present invention is explained with reference to the drawings.

Figure 1:
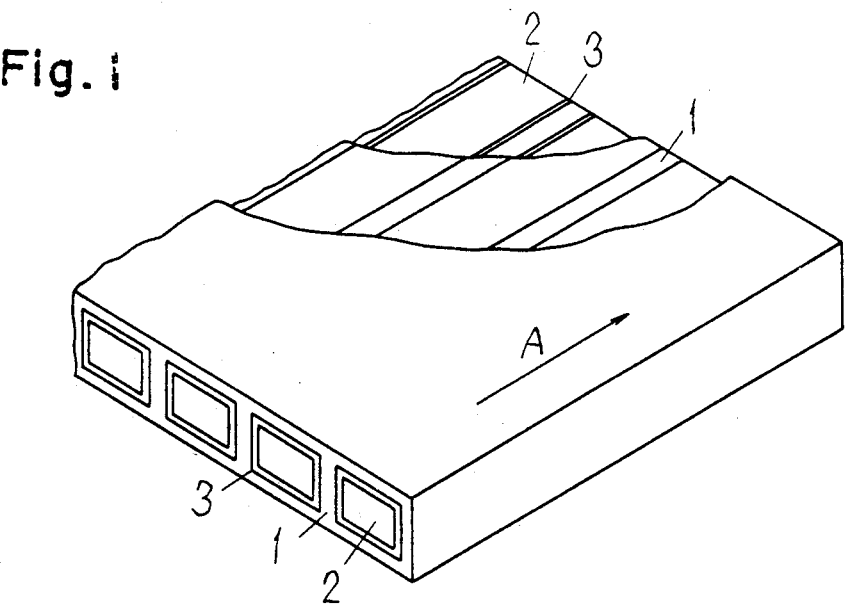
FIG. 1 is a partly-broken away perspective view of a waveguide sheet according to one embodiment of the present invention.

FIG. 1 is a partly-broken away view of an optical waveguide sheet according to one embodiment of the present invention, wherein reference numeral 1 denotes a cladding portion containing scatterers, reference numeral 2 denotes a core portion, and reference numeral 3 denotes a cladding layer which is devoid of scatterers.

Figure 2:
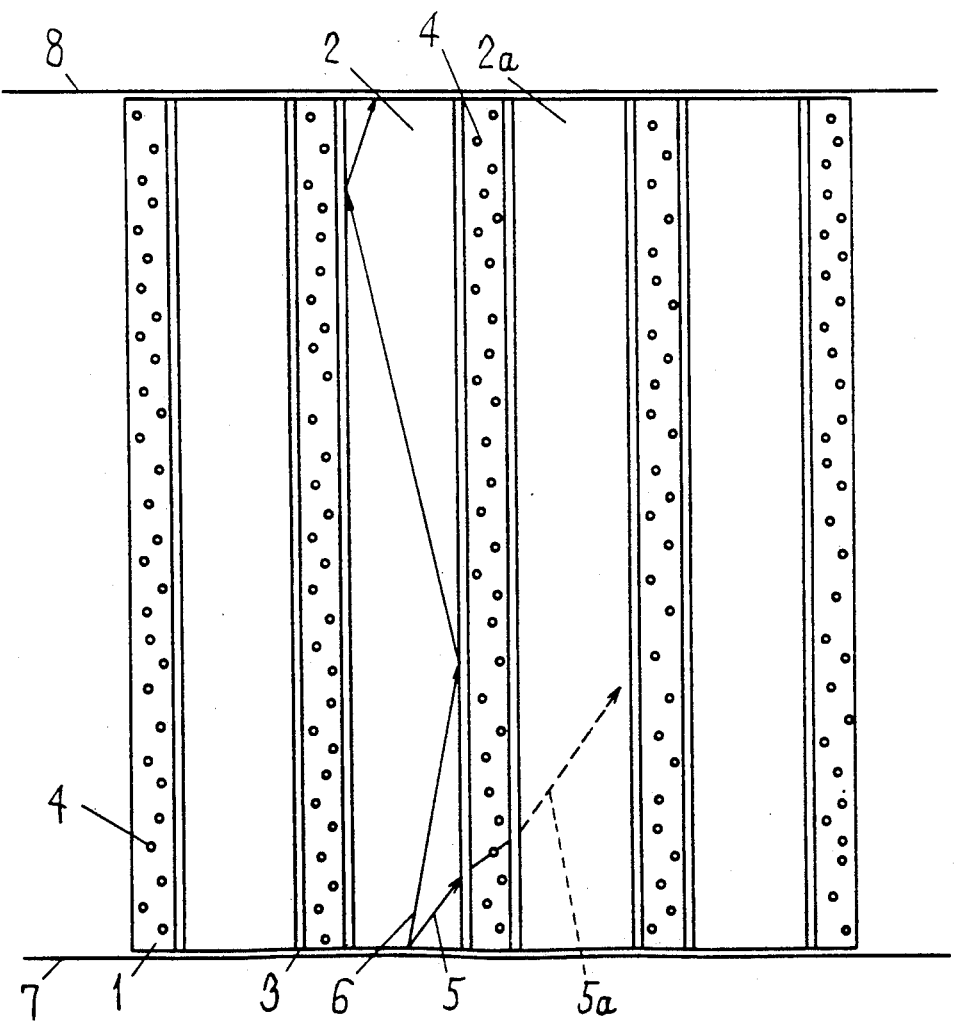
FIG. 2 is a sectional view of FIG. 1, FIG. 3-6 are respective views for explaining a method of manufacturing an optical waveguide sheet of the present invention.

FIG. 2 is a sectional view in the direction A shown in FIG. 1, wherein reference numeral 4 denotes scatterers, reference numeral 5 denotes incident light entering at an angle which is greater than a critical angle determined by the respective refraction factors of the core portion 2 and the cladding layer 3, reference numeral 5a denotes a path of the incident light 5 in the case of an absence of scatterers 4, reference numeral 6 denotes incident light entering at an angle which is smaller than the critical angle, reference numeral 7 denotes a copy surface and reference numeral 8 denotes a photo-sensor surface.

From among the light reflected from the illuminated copy surface, the incident light entering at an angle which is smaller than the critical angle is repeatedly totally-reflected at the boundary between the core portion 2 and the cladding layer 3 to reach the photo-sensor surface 8. In addition, the incident light entering at an angle which is greater than the critical angle enters the adjacent core portion 2a after passing through the cladding layer 3 and the cladding portion 1 since such incident light is not totally reflected at the boundary between the core portion 2 and the cladding layer 3. However, due to the existence of the scatterers 4 in the cladding portion 1, the incident light 5 is scattered and only a small portion of such light enters the adjacent core 2a. Thus, the resolution of the image is enhanced.

If the cladding layer 3 was not present, as in the conventional example, when the incident light 6 entering at an angle which is smaller than the critical angle is reflected at the boundary between the core portion 2 and the cladding portion 1, the reflection efficiency thereof is reduced due to the presence of scatterers at the boundary. On the other hand, the incident light 6 is totally reflected at a high reflection efficiency due to the existence of the cladding layer 3.

That is, according to this invention, a plurality of optical waveguides which transmit image information on the copy surface 7 to the photo-sensor surface 8 are arranged in a flat plate-like form, scatterers 4 are disposed in the cladding portion 1, and the cladding layer 3 being devoid of the scatterers 4 is disposed between the core portion 2 and the cladding portion 1. Thus, an optical wave guide sheet having a high image resolution and high transmissibility of reflected light can be provided at a low cost.

In the above embodiment, even if quantity of scatterers 4 in the cladding portion 1 is excessive and the cladding function is lost, since the surface of the core portion 2 has the cladding portion 3, the waveguide does not become inoperable. Accordingly, the cladding portion 1 containing the scatterers 4 can be replaced with colored frame.

Figure 3:
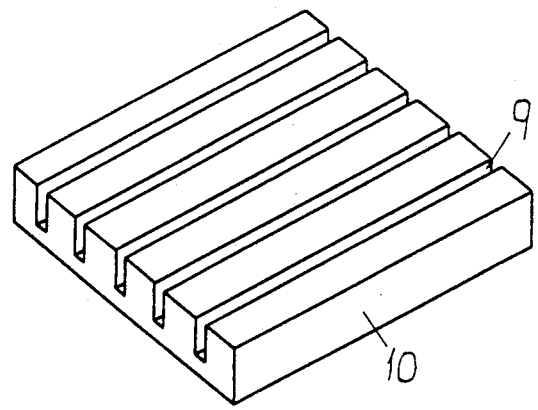
Figure 4:
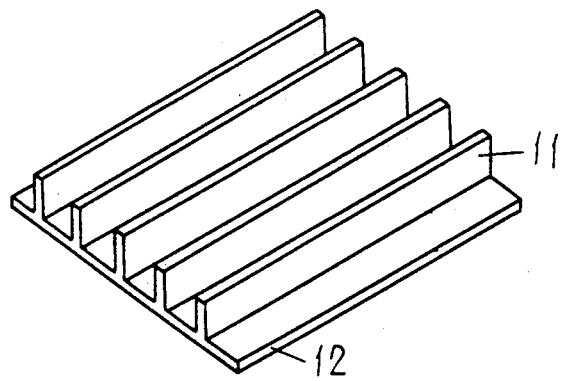
Figure 5:
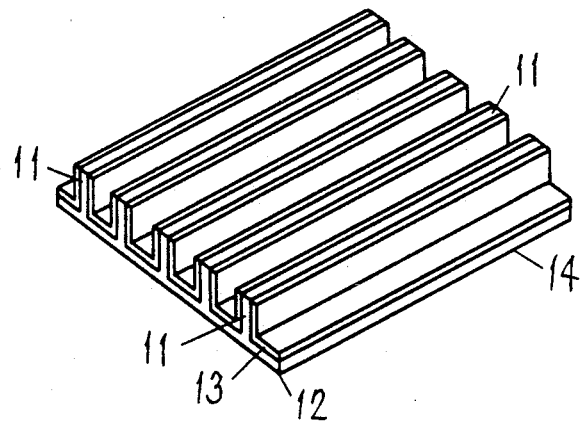
Figure 6:
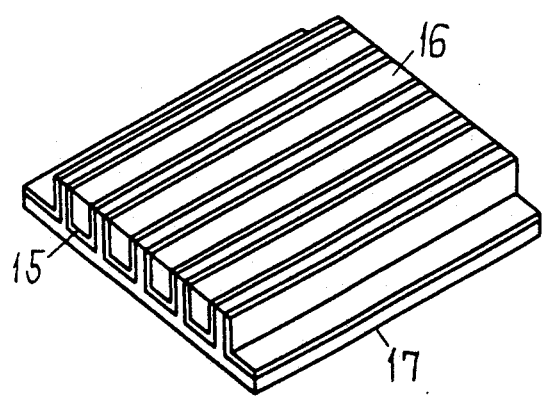

FIG. 3–FIG. 6 are for explaining a method of manufacturing an optical waveguide sheet of the present invention. FIG. 3 is a perspective view of a cladding mold used for molding the cladding portion 1, FIG. 4 is a perspective view of a sheet base made of a cladding material and formed using the cladding mold, FIG. 5 is a perspective view of a sheet coated on inner walls with a cladding material, and FIG. 6 is a perspective view of a sheet having a core material disposed therein.

More particularly, the cladding material having scatterers is made to flow into the cladding mold 10 and a mold separation process is carried out after solidification, whereby a sheet base 12 having vertical walls 11 as shown in FIG. 4 is obtained. The material solidification process can be carried out, for example, by ultra-violet irradiation, heating, and solvent removal. Then, as shown in FIG. 5, the inner concave surface formed between adjacent walls 11 is coated with a cladding material 13 which is devoid of scatterers, and upon its hardening a sheet 14 is obtained. Then, as shown in FIG. 6, the concave portion 15 formed by the cladding material 13 is filled with a core material 16 and upon its solidification, and a partial optical waveguide sheet 17 is obtained.

A sheet made of a cladding material and having the scatterers disposed therein in a specified pitch, is formed on the upper surface of the partial optical waveguide sheet 17, whereby a finished product as shown in FIG. 1 is obtained. However, this process is relatively complicated, but even if the partial optical waveguide sheet 17 shown in FIG. 6 is directly coated with a cladding material having scatterers, an optical waveguide sheet which functions almost equal to that of the optical waveguide sheet shown in FIG. 1 can be obtained.

In the following, another embodiment of the present invention is explained.

Figure 7:
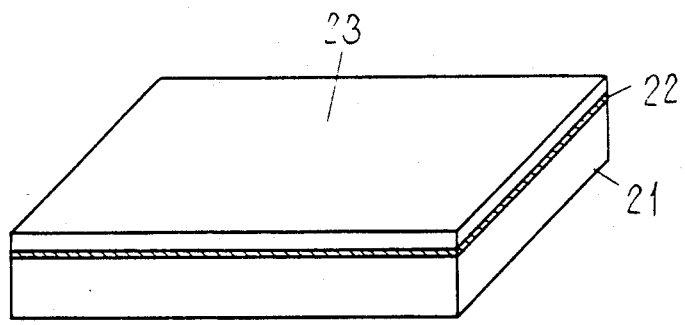
FIG. 7-FIG. 13 are views for explaining a method of manufacturing an optical waveguide sheet in other embodiment of the present invention.
Figure 8:
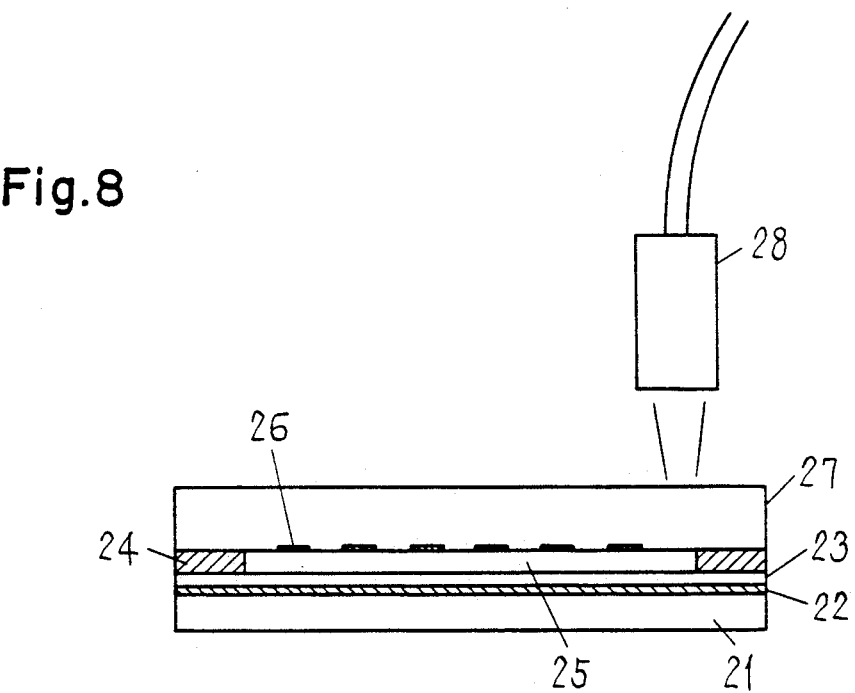
Figure 9:
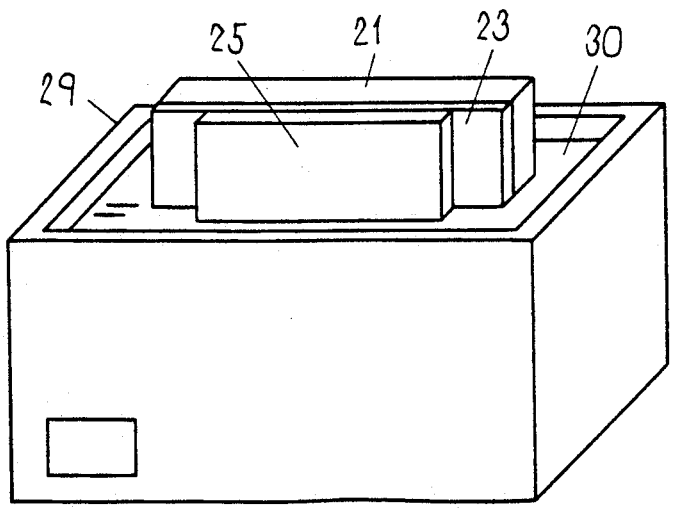
Figure 10:
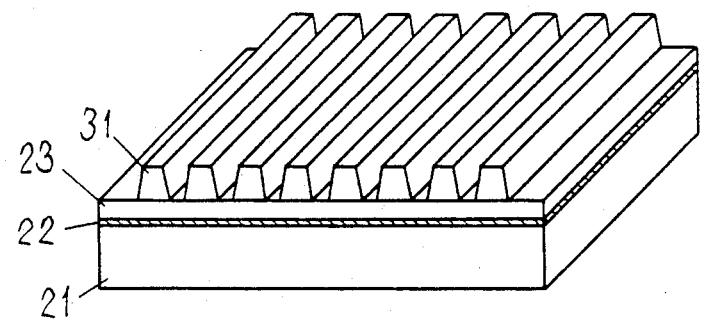
Figure 11:
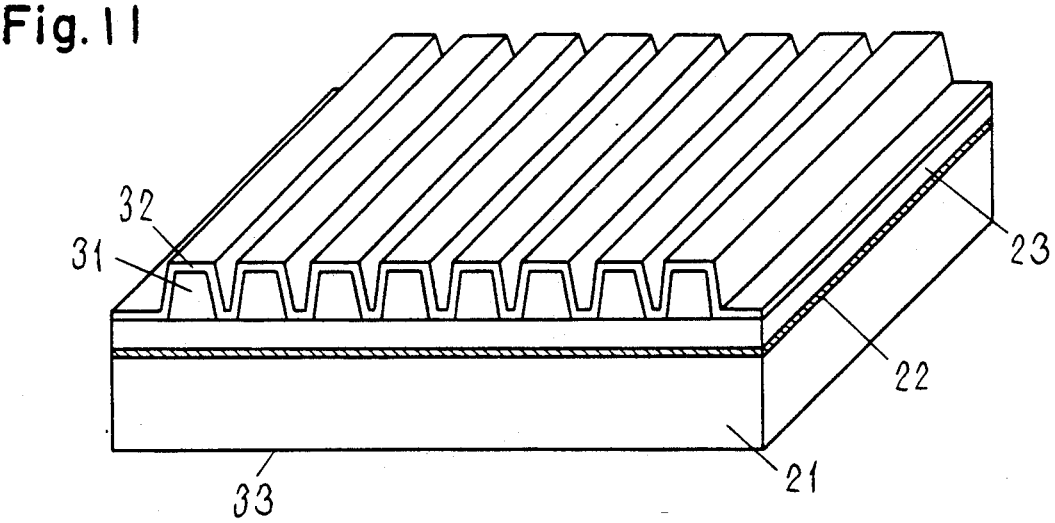
Figure 12:
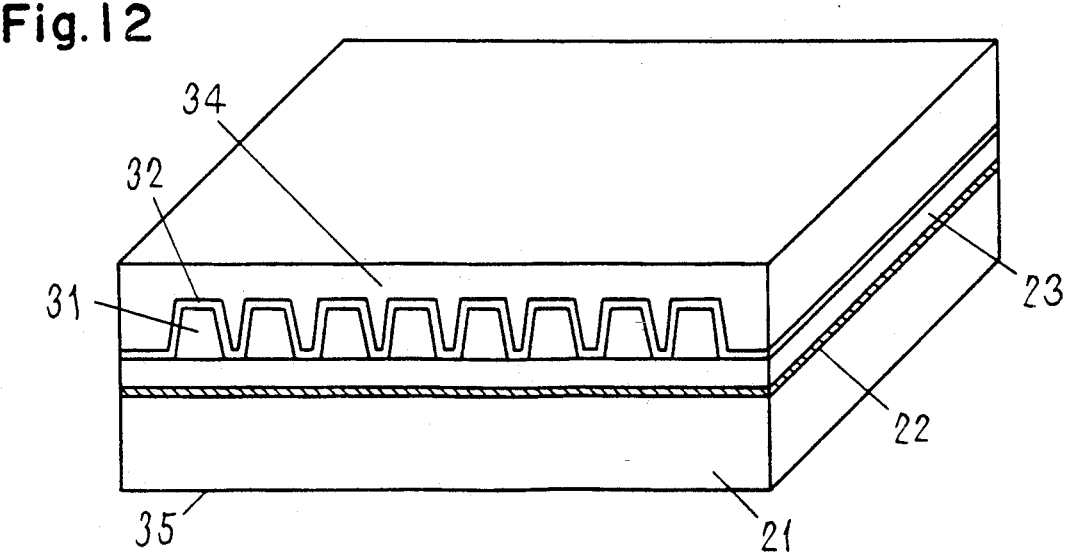
Figure 13:
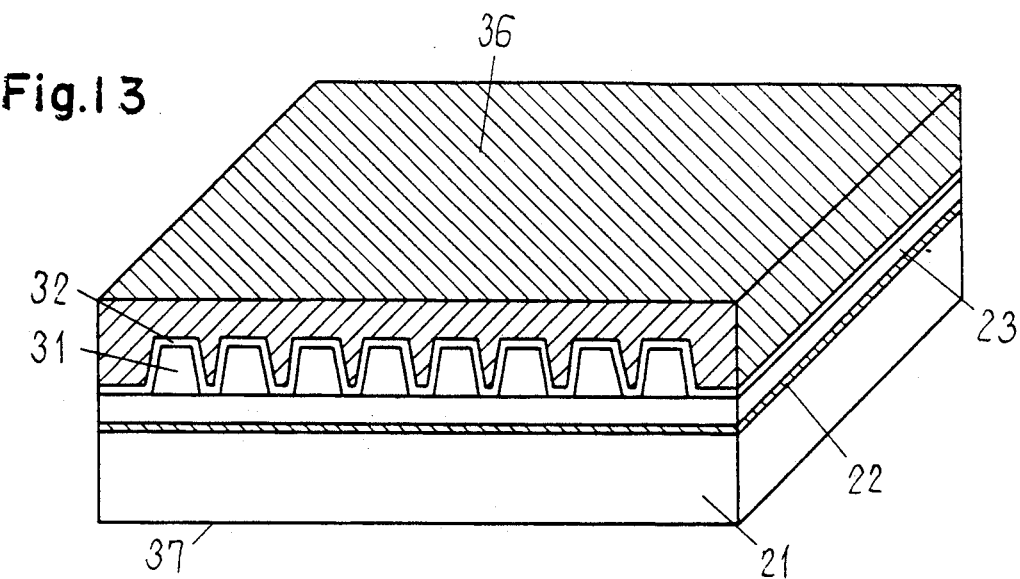
Figure 14:
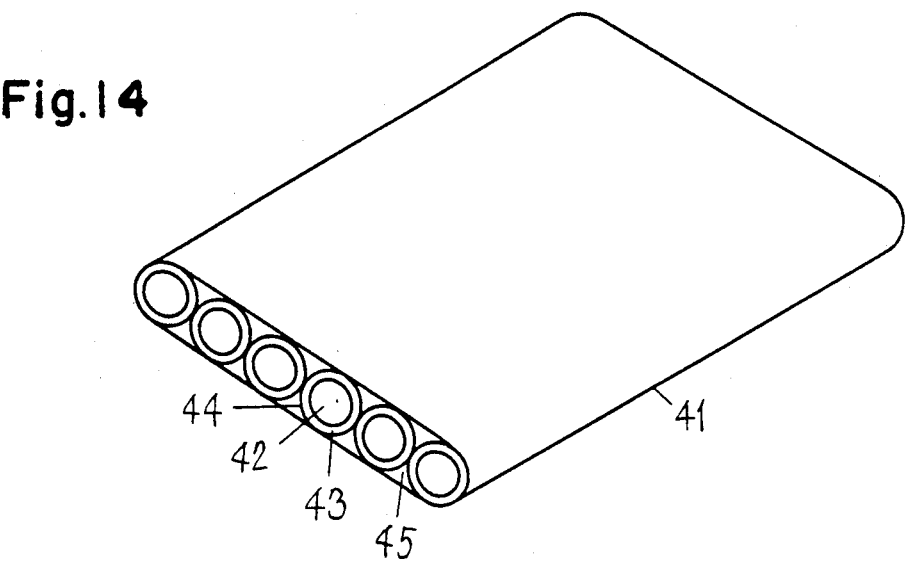
FIG. 14 and FIG. 15 are, respectively, a perspective view and a partly-broken away perspective view of an optical waveguide sheet.
Figure 15:
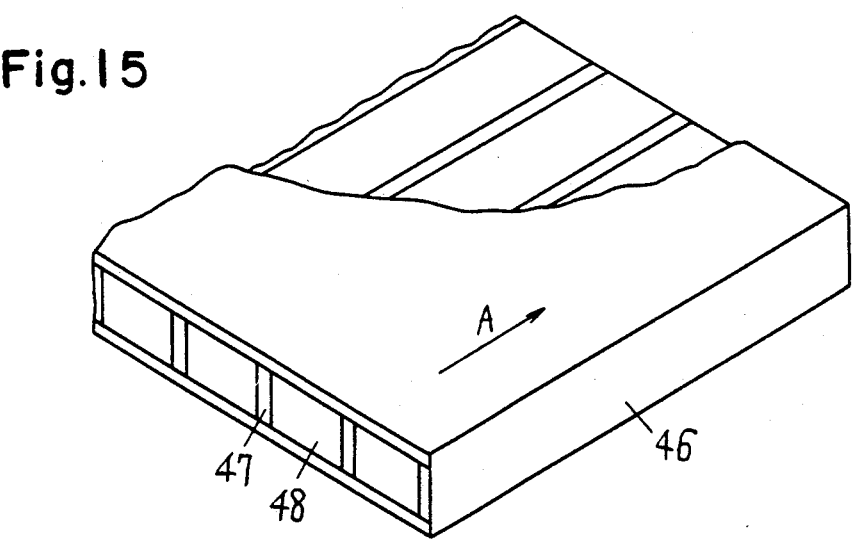
Figure 16:
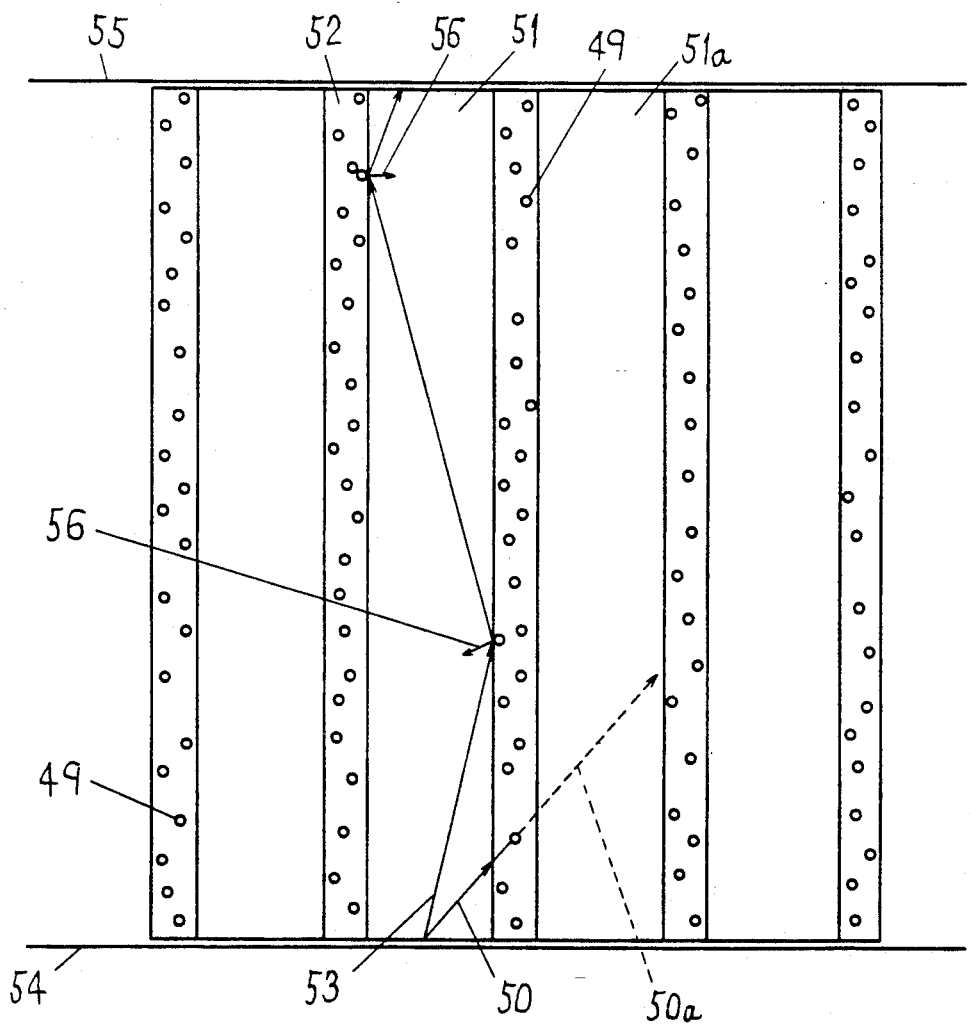
FIG. 16 is a sectional view of FIG. 15.

FIG. 7–FIG. 13 are drawings for explaining a second method of manufacturing an optical waveguide sheet of the present invention. FIG. 7 is a perspective view of a base glass plate applied with a cladding, FIG. 8 is a section view for explaining a UV exposure process, FIG. 9 is a perspective view for explaining an ultrasonic process, FIG. 10 is a perspective view of a base glass plate incorporating a core portion, FIG. 11 is a perspective view of a base glass plate in which a cladding coating is formed on the outer circumference of a core portion, and FIG. 12 and FIG. 13 are perspective views of an optical waveguide sheet.

More particularly, as shown in FIG. 7, a shading layer 22 and a cladding layer 23 are formed on a glass plate 21. Then, as shown in FIG. 8, a spacer 24 is placed on the cladding layer 23 and a void thus formed is filled with a liquid core material 25. A mask base plate 27 having a striped pattern 26 is placed over the core material 25, and UV light is irradiated via a UV condenser lens 28. Then, a shown in FIG. 9, the base glass plate 21 together with the UV irradiated core portion are immersed in an ultra-sonic cleaning device 29 filled with an organic solvent, and a core 31 formed at a regular pitch as shown in FIG. 10 is thereby obtained. Next, the outer circumference of the thus obtained core is coated with a liquid cladding material 32 which is devoid of scatterers, and upon its hardening an optical waveguide sheet 33 is obtained. In this state, if there is incident light entering at an angle which is greater than the critical angle of the waveguide, crosstalk between adjacent cores arises as a practical problem. Accordingly, referring to FIG. 12, a cladding material 34 containing absorbers or scatterers is formed as shown to obtain a low crosstalk optical waveguide sheet 35. In addition, as shown in FIG. 13, in place of the cladding material containing the absorbers or scatterers, a colored material 36 for shielding light may be used, and a low crosstalk optical waveguide sheet 37 can thereby be obtained. The shading layer 22 helps prevent incident light from positions other than the core end surface from reaching the sensor unit. However, the shading layer 22 is not necessarily required.

As mentioned above, the present invention is an optical waveguide sheet in which a plurality of optical waveguides formed in a sheet-like manner transmit information from the copy surface to the photo-sensor surface, in which scatterers are disposed in a first cladding portion of each optical waveguide, and in which a second cladding layer having no scatterers is formed between the core portion and the first cladding portion, resulting in a high resolution and transmissibility of reflected light and reduced manufacturing cost.

What is claimed is:

1. An optical waveguide device comprising a plurality of optical waveguides extending parallel and adjacent each other in a sheet-like form, each of said plurality of waveguides comprising;

a core portion;

an inner cladding layer formed on a periphery of said core portion, said inner cladding layer being devoid of light scatterers disposed therein; and, an outer cladding layer, having light scatterers disposed therein, formed on a periphery of said inner cladding layer.

2. An optical waveguide device comprising:

a plurality of waveguide core members extending parallel and spaced apart from each other in substantially a same plane;

an inner cladding layer formed on a periphery of each of said plurality of waveguide core members, said inner cladding layer being devoid of light scatterers disposed therein; and, an outer layer formed between said inner cladding layers of adjacent waveguide core members, wherein said outer layer is comprised of a cladding material having light scatterers disposed therein for inhibiting crosstalk between adjacent waveguide core members.

* * * * *